(12) United States Patent
Kuntz et al.

(10) Patent No.: US 6,366,621 B1
(45) Date of Patent: Apr. 2, 2002

(54) METHOD OF ESTIMATING PILOT SIGNAL PHASE IN A DIGITALLY MODULATED RF SIGNAL

(75) Inventors: Thomas L. Kuntz, Portland; Xiaofen Chen, West Linn, both of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/185,218

(22) Filed: Nov. 3, 1998

(51) Int. Cl.[7] .................................................. H03D 1/24
(52) U.S. Cl. ........................................ 375/321; 329/357
(58) Field of Search ................................. 375/321, 270, 375/277; 329/357; 332/170; 455/47, 409, 204

(56) References Cited

U.S. PATENT DOCUMENTS

| | | | | |
|---|---|---|---|---|
| 4,091,410 A | * | 5/1978 | Citta | 348/726 |
| 5,416,524 A | * | 5/1995 | Citta et al. | 348/471 |
| 5,815,536 A | * | 9/1998 | Abe | 375/344 |
| 5,886,748 A | * | 3/1999 | Lee | 348/614 |
| 6,115,431 A | * | 9/2000 | Lee | 375/324 |

OTHER PUBLICATIONS

"VSB Modulation Used for Terrestrial and Cable Broadcasts" by Gary Sgrignoli, Wayne Bretl, Richard Citta, Zenith Electronics Corporation, 6/95.

* cited by examiner

*Primary Examiner*—Chi Pham
*Assistant Examiner*—Khai Tran
(74) *Attorney, Agent, or Firm*—William K. Bucher; Francis I. Gray

(57) ABSTRACT

A method of estimating pilot signal phase embedded in a wideband digital signal modulating a RF signal that is down converted to an intermediate frequency and digitized includes the steps of summing a block of the signal samples for removing the modulation data and generating data values representative of vector locations of the pilot signal with each data value representing an angular rotation of the pilot signal vector, and calculating the phase of the pilot signal by determining the arc tangent of the data values. The method produces a computationally efficient narrow band filter generated at the pilot signal frequency by simple addition of the digital data values. The method is usable in a software based 8-VSB digital television demodulation system.

7 Claims, 8 Drawing Sheets

US 6,366,621 B1

METHOD OF ESTIMATING PILOT SIGNAL PHASE IN A DIGITALLY MODULATED RF SIGNAL

BACKGROUND OF THE INVENTION

The present invention relates generally to a method of estimating the phase of an electrical signal and more specifically to estimating the phase of a pilot tone or sinusoid embedded in a wideband digital signal modulating a radio frequency (RF) carrier signal.

One conventional way of estimating the phase of a pilot signal or tone embedded in a wideband digital signal modulating a radio frequency (RF) carrier signal is to bandpass filter the signal around the pilot tone, down convert the RF signal to baseband and then perform phase tracking. Since the RF signal is data-bearing, the bandpass filter needs to have a very narrow bandwidth to extract the pilot signal. Constructing such a narrow bandpass filter in the digital domain requires implementing a filter with a large number of taps requiring repetitive multiply and add operations that proves to be computationally expensive. Computationally expensive is a term in the digital and the software arts for processes that require a substantial amount of time to perform. The performance of electronic devices decrease as a result of these slow computational processes.

An example of a system using a digitally modulated RF signal with a pilot tone is the new Digital Television Standard developed by the Advanced Television Systems Committee (ATSC) and adopted by the Federal Communications Commission. The Digital Television Standard is designed to transmit high quality video, audio and ancillary data over a 6 MHz channel. The Standard describes the channel coding and modulation RF/transmission subsystems for terrestrial and cable applications. The modulation subsystem uses a digital data stream to modulate the transmitted signal and may be implemented in two modes: a terrestrial broadcast mode (8-VSB) delivering about 19 Mbps, and a higher data rate mode (16-VSB) delivering about 38 Mbps for cable television systems where higher signal to noise is ensured.

The modulation technique implemented in the Digital Television Standard was developed by Zenith Electronics Corp. and employs vestigial sideband modulation. The overall system response of the transmitter and receiver filtering corresponds to a raised cosine filter to avoid system generated intersymbol interference. The system response is implemented with serially coupled, nominally identical root raised cosine filters in the transmitter and in the receiver.

The incoming digital data stream is randomized, forward-error-correction (FEC) encoded and interleaved. The randomized, FEC coded and interleaved data is trellis encoded as an 8-level (3-bit) one dimensional constellation. The outputs of the trellis coder are mapped into symbols that are one of eight symmetric odd-valued integer levels from −7 to +7 units. To aid synchronization in low signal to noise and/or high multipath situations, segment and field syncs are inserted in the 10.76 Msymbols/sec symbol stream. A small pilot tone is added as well at the carrier frequency generated by offsetting the real or I channel of the complex baseband signal containing the data and the sync pulses by 1.25 units. The offset causes the pilot tone to be in-phase with the I channel signal component. At the transmitter, the composite signal passes through a root raised cosine filter and modulates an intermediate frequency carrier signal which is up-converted to an RF frequency for transmission at the desired channel frequency. Alternately, the composite signal may be used to directly modulate the RF carrier.

Referring to FIG. 1, there is shown a representative block diagram of a VSB receiver for extracting the digital television signal data from the digitally modulated RF signal as described in the "Guide to the Use of the ATSC Digital Television Standard" published by the ATSC. The receiver 10 receives the UHF or VHF signal through a band-pass filter and broadband tracking filter 12. A wideband amplifier 14 increases the signal and couples it to a first mixer 16. The mixer is driven by a 1st local oscillator 18 that tunes over a range from 978 to 1723 MHz. The 1st local oscillator 18 is synthesized by a phase locked-loop and controlled by a microprocessor (not shown). The output of the mixer 16 is an up-converted intermediate frequency (IF) signal at 920 MHz. The IF signal is coupled to an LC filter 20 in tandem with a band-pass ceramic resonator filter 22 centered at 921 MHz. An IF amplifier 24 is placed between the two filters. The IF signal is coupled to a second mixer 26 that is driven by 2nd local oscillator 28. The 2nd local oscillator 28 is an 876 MHZ voltage controlled SAW oscillator controlled by a frequency and phase-locked loop (FPLL) synchronous detector 30. The output of the second mixer 26 is centered at 45 MHz. This IF signal that drives a constant gain 44 MHZ amplifier 32. The output of the amplifier 32 is coupled to an IF SAW filter 34. The IF SAW filter 34 implements an approximation of the transmission system's root raised cosine filter at the receiver. The output of the SAW filter 34 is coupled to the FPLL synchronous detection circuitry 30 via an AGC controlled amplifier 36.

Carrier recovery is performed on the pilot signal by the FPLL synchronous detector circuit 30. The operation of this circuit is described in U.S. Pat. No. 4,091,410, assigned to Zenith Electronics Corp. The configuration provides a Phase locked Loop (PLL) function with a very wide pull-in range which insures rapid carrier acquisition. The I-channel composite baseband data signal from the FPLL synchronous detector 30 is coupled through a low pass filter 54 to an analog-to-digital converter (AID) 56 that is clocked by a properly phased 10.76 MHZ symbol clock 58. The digital data from the A/D converter 56 is coupled to a data segment sync (DSS) detector 60 having a narrow bandwidth filter for detecting from the synchronously detected random data the repetitive data segment syncs as described in U.S. Pat. No. 5,416,524, assigned to Zenith Electronics Corp. A control voltage error signal from the data segment sync detector 60 locks the symbol clock to the incoming data clock frequency.

What is needed is a method for estimating the phase of a pilot signal or tone equivalent to a carrier in a digitally modulated signal where the pilot signal is contaminated by the digital data and unrelated phase noise. Preferably, the phase estimation method should be performed on an intermediate frequency carrier of a complex digitally modulated RF signal containing a pilot signal at the IF frequency. The phase estimation method needs to implement a computationally efficient narrow pass filter on the pilot signal at the IF frequency that filters the digital modulation data. The phase estimation method further needs to efficiently compute the phase between the intermediate frequency signal and the sampling signal over a block of the signal samples.

SUMMARY OF THE INVENTION

Accordingly, an object of the present invention is a method of estimating the phase of a pilot signal or tone embedded in a wideband signal modulating a RF signal that implements a computationally efficient narrow pass filter for removing the digital modulation data from a digitized intermediate frequency signal.

Another object of the present invention is a method of estimating the phase of a pilot signal or tone embedded in a wideband digital signal modulating a RF signal that efficiently estimates the phase of the pilot tone over a block of the signal samples.

The method of estimating the phase of a pilot signal or tone is implemented in a digital acquisition system that generates an intermediate frequency (IF) signal with the pilot tone frequency being set at an IF frequency having a relationship to the sampling frequency as $f_{IF}=f_s/M$ where M takes an integer value equal to or greater than 2. In the preferred embodiment of the present invention, the IF frequency has a M=4 times relationship with the reference sampling frequency (i.e. the IF signal is sampled at four times the pilot tone/IF frequency). The phase estimation method includes the steps of summing a block of the signal samples for removing the modulation data and generating data values representative of the phase angle of the pilot signal. The method also includes the step of calculating the phase of the pilot signal with respect to the reference signal by determining the arc tangent of the data values. The reference signal is a cosine wave having a phase of 0° at the first sample instance and whose phase progresses linearly through 360° of phase angle over every cycle of N sample points. The calculating step also includes the additional step of determining sine and cosine values of the pilot signal phase using the data values.

When the digitally modulated IF signal is sampled at four times the pilot frequency, the summing step further includes the step of generating two data values representing of cosine values of the angular rotation of the pilot signal vector and two data values representing sine values of the angular rotation of the pilot signal vector. The two data values representing the cosine values are one-hundred and eighty degrees apart from each other and the two data values representing the sine values are one-hundred and eighty degrees apart from each other. The respective cosine and sine data values are averaged by summing the negative of one of the cosine values with the other cosine value to generate a data point representing the cosine value of the angular rotation of the pilot vector and the negative of one of the sine values with the other sine value to generate a data point representing the sine value of the angular rotation of the pilot vector.

The intermediate frequency carrier and pilot signal may drift in phase over time generating a variable phase between the pilot signal and the reference signal that is compensated for by the additional steps of decimating the block of signal samples by summing sub-blocks within the block of signal samples for removing the modulation data and generating data values representative of vector locations of the pilot signal with each of the data values representing an angular rotation of the pilot signal vector within the sub-blocks with each sub-block being offset from the previous sub-block by a decimation factor. The pilot phase is calculated with respect to the reference signal by determining the arc tangent of the data values within the sub-blocks. The pilot signal phases of the sub-blocks are further filtered with a filter having sufficient bandwidth for tracking phase drift. An additional step of interpolating between the calculated pilot signal phases of the sub-blocks may be employed for generating additional pilot signal phases.

The objects, advantages and novel features of the present invention are apparent from the following detailed description when read in conjunction with the appended claims and attached drawings.

DETAILED DESCRIPTION OF THE PREFERRED EMBODIMENT

The phase estimation method according to the present invention uses signal samples representative of a modulated intermediate frequency (IF) wideband signal having a pilot signal or sinusoid at the IF carrier. The method estimates the phase of a sinusoid, which is a part of a "compound" signal consisting of the sinusoid and a wideband noise like signal component. The phase estimation method assumes a fixed, integral M relationship between the sinusoid frequency and the frequency of a sampling signal, with $M \geq 2$ samples of the compound signal available per sinusoid period. Additionally, the noise like signal component is zero-mean so that summing a large number of compound signal samples taken at sample instances with identical sinusoid phase will converge toward an integer multiple of the sinusoid value at that phase. The noise like signal component may be any type of analog or digital signal amplitude modulating the IF signal.

Figure 1:
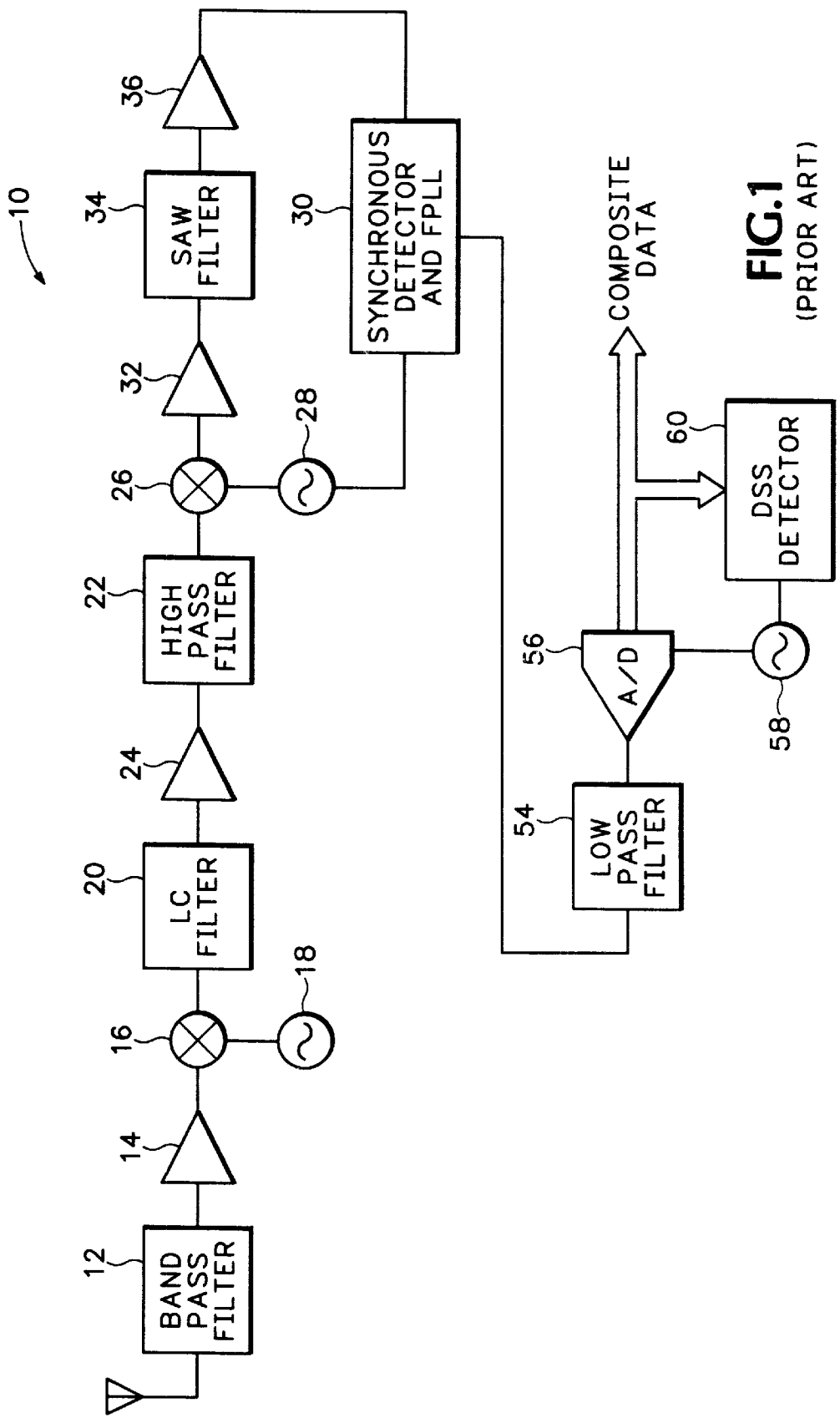
FIG. 1 is a block diagram of a prior art 8-VSB receiver for down converting a digitally modulated RF carrier signal to baseband digital data values representative of the digital modulation.
Figure 2:
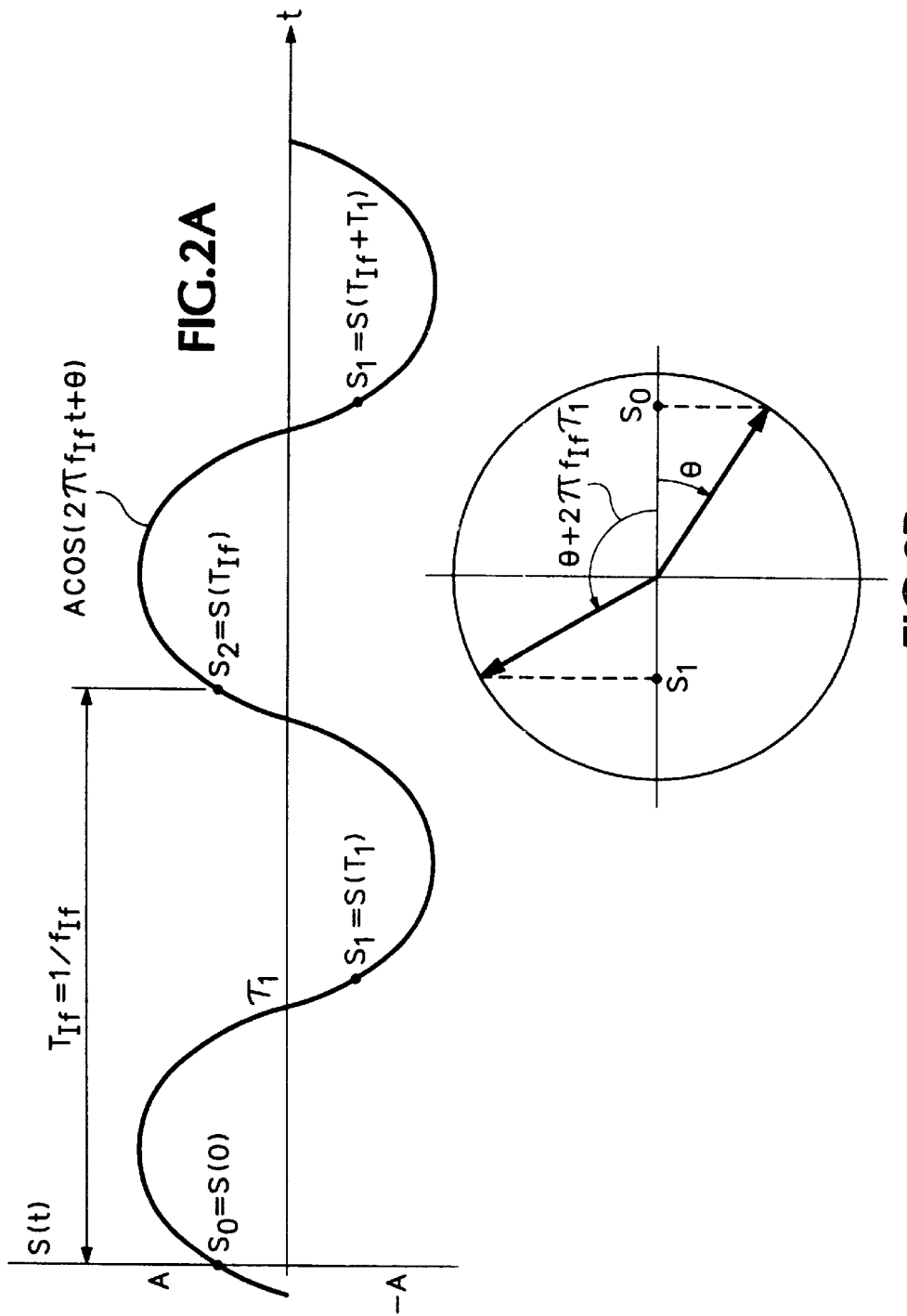
FIGS. 2A and 2B respectively illustrate a graphical representation of a sinusoid and a corresponding vector diagram for explaining the phase estimation method according to the present invention.

FIGS. 2A and 2B respectively illustrate a graphical representation of a sinusoid and a corresponding vector diagram for explaining the phase estimation method of the present invention. The sinusoid in FIG. 2A shows two samples of the signal being acquired per cycle as is represented by $s_0$ and $s_1$. Samples $s_0$ and $s_1$ can be described trigonometrically as:

$$s_0 = A\cos\theta \qquad (1)$$

$$\begin{aligned} s_1 &= A\cos(\theta + 2\pi f_{IF}t_1) \\ &= A\sin\left(\theta + 2\pi f_{IF}t_1 + \frac{\pi}{2}\right) \\ &= A\sin(\theta + \phi) \\ &= A[\sin\theta\cos\phi + \cos\theta\sin\phi] \end{aligned} \qquad (2)$$

$$\begin{aligned} \frac{s_1}{s_0} &= \frac{A[\sin\theta\cos\phi + \cos\theta\sin\phi]}{A\cos\theta} \\ &= (\tan\theta)(\cos\phi) + \sin\phi \end{aligned} \qquad (3)$$

-continued $$\theta = \tan^{-1}\left[\frac{\frac{s_1}{s_0} - \sin\phi}{\cos\phi}\right] \quad (4)$$

where $$\phi = 2\pi\left(f_{IF}t_1 + \frac{1}{4}\right)$$

is a constant

In a general sense, samples $s_0$ and $s_1$ may be acquired at any arbitrary point in the cycle. However, if θ is equal to ±90°, then $s_0$ equals 0 or for $t_1$ equals $T_{IF}/2$, which equals $\frac{1}{2}f_{IF}$, then cos φ equals 0 and the solution for θ becomes indeterminate. Further, the solution for θ may require an adjustment of 180° due to the ambiguity of the arc tangent function.

Equation 4 may be simplified by acquiring the samples $s_0$ and $s_1$ at t and t+¼ $T_{IF}$ period (i.e. 90° apart).

$$\text{If } t_1 = \frac{T_{IF}}{4} = \frac{1}{4f_{IF}}, \phi = 2\pi\left(\frac{1}{2}\right) = \pi \quad (5)$$

$$\theta = \tan^{-1}\left(\frac{\frac{s_1}{s_0} - 0}{-1}\right)$$

$$\theta = \tan^{-1}\left(-\frac{s_1}{s_0}\right) \quad (6)$$

For a compound signal with a sinusoid s(t) and noise like zero mean signal n(t):

$$r(t) = A\cos(2\pi f_{IF}t + \theta) + n(t) \quad (7)$$

$$S_0 = \sum_{k=0}^{N-1} r(kT_{IF}) \quad (8)$$

$$= \sum_{k=0}^{N-1} A\cos(2\pi k + \theta) + \sum_{k=0}^{N-1} n(kT_{IF})$$

$$= \sum_{k=0}^{N-1} A\cos\theta + 0$$

$$= NA\cos\theta$$

likewise:

$$S_1 = \sum_{k=0}^{N-1} r\left(kT_{IF} + \frac{1}{4f_{IF}}\right) \quad (9)$$

$$= \sum_{k=0}^{N-1} A\cos\left(2\pi k + \frac{\pi}{2} + \theta\right) + \sum_{k=0}^{N-1} n\left(kT_{IF} + \frac{1}{4f_{IF}}\right)$$

$$= \sum_{k=0}^{N-1} (-A\sin\theta) + 0$$

$$= -NA\sin\theta$$

$$\frac{S_1}{S_2} = \frac{-NA\sin\theta}{NA\cos\theta} = -\tan\theta \quad (10)$$

$$\theta = \tan^{-1}\left(-\frac{S_0}{S_1}\right) = \tan^{-1}\left(-\frac{\sum_{k=0}^{N-1} r\left(kT_{IF} + \frac{1}{4f_{IF}}\right)}{\sum_{k=0}^{N-1} r(kT_{IF})}\right) \quad (11)$$

Expanding on the basic trigonometric relationship between the sinusoid and the sampling signal, if four equal interval samples are acquired per cycle (M4), then $t_1=1/(4f_{IF})$, $t_2=1/(2f_{IF})$, $t_3$ 32 3/(4$f_{IF}$).

$$s_0 = A\cos\theta \quad (12)$$

$$s_1 = A\cos(\theta + 2\pi f_{IF}t_1) = -A\sin\theta \quad (13)$$

$$s_2 = A\cos(\theta + 2\pi f_{IF}t_2) = -A\cos\theta \quad (14)$$

$$s_3 = A\cos(\theta + 2\pi f_{IF}t_3) = A\sin\theta \quad (15)$$

$$s_0 - s_2 = A\cos\theta - (-A\cos\theta) = 2A\cos\theta \quad (16)$$

$$s_3 - s_1 = A\sin\theta - (-A\sin\theta) = 2A\sin\theta \quad (17)$$

$$\frac{s_3 - s_1}{s_0 - s_2} = \frac{2A\sin\theta}{2A\cos\theta} = \tan\theta \quad (18)$$

$$\theta = \tan^{-1}\left(\frac{s_3 - s_1}{s_0 - s_2}\right) \quad (19)$$

For a compound signal with a sinusoid and noise like zero mean signal:

$$\theta = \tan^{-1}\left(\frac{\sum_{k=0}^{N-1} r\left(\left(k + \frac{3}{4}\right)T_{IF}\right) - \sum_{k=0}^{N-1} r\left(\left(k + \frac{1}{4}\right)T_{IF}\right)}{\sum_{k=0}^{N-1} r(kT_{IF}) - \sum_{k=0}^{N-1} r\left(\left(k + \frac{1}{2}\right)T_{IF}\right)}\right) \quad (20)$$

The preferred embodiment of the phase estimation method is implemented in a instrumentation receiver that demodulates and performs measurements on an 8-VSB digitally modulated carrier television signal. It is understood that other digitally modulated carrier signals with a pilot tone could be used in implementing the present invention.

Figure 3:
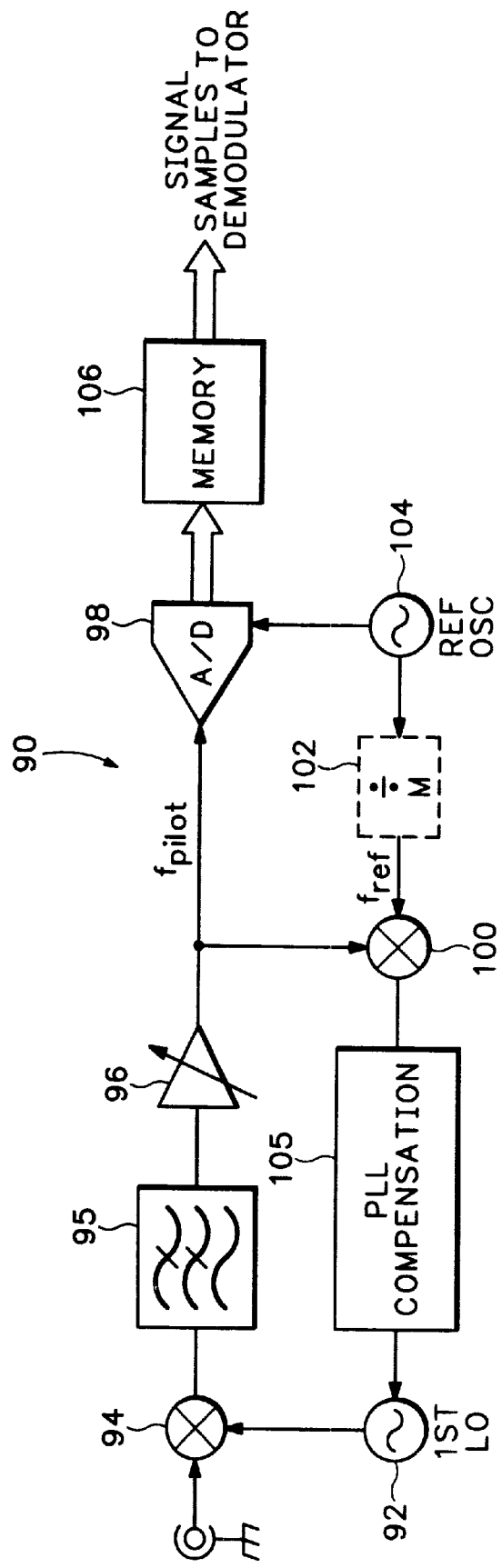
FIG. 3 is a representative block diagram of an instrumentation receiver for generating signal samples representative of a phase locked digitally modulated intermediate frequency signal at a sampling signal frequency for implementing the method of estimating the pilot signal phase according to the present invention.

Referring to FIG. 3, there is shown a representative block diagram of the instrumentation receiver 90 implementing the optimum relationship between a digitally modulated IF carrier and a sampling signal that drives an A/D converter at M times the IF carrier. The instrumentation receiver 90 is a microprocessor controlled receiver that accepts an 8-VSB or other wideband digital signal having a pilot signal at the carrier frequency. The receiver 90 produces signal samples representative of the digitally modulated IF signal. The instrumentation receiver is described in greater detail in co-pending patent application Ser. No. 09/054,976, filed Apr. 3, 1998. A 1st local oscillator (LO) 92 is tunable over at range of frequencies by a microprocessor (not shown) for generating an output signal that mixes with an incoming digitally modulated RF signal in mixer 94. A low pass filter 95, which is very wide with respect to the IF bandwidth used by the receiver, removes the sum products of the mixer 94 and any local oscillator 92 signal that may feed through (i.e. leak) the mixer 94. The output of low pass filter 95 is a digitally modulated intermediate frequency signal having the pilot signal $f_{pilot}$ nominally at the same frequency as the digital symbol frequency, which for an 8-VSB system is approximately 10.76 MHz. A variable gain amplifier 96 amplifies the IF signal and couples the amplified IF signal to the input of A/D converter 98 and a 2nd mixer 100, operating as a phase detector. The phase detector 100 receives a reference signal $f_{ref}$ (i.e. 10.76 MHz) from a divide by M circuit 102 interposed between a reference oscillator 104 and the phase detector 100 for dividing down the reference oscillator 104 signal to the digital modulation frequency. The reference oscillator 104 generates a reference oscillator signal having a frequency that is M times the digital modulation frequency or approximately 43.04 MHz for M=4. The phase difference signal from the phase detector 100 passes through a Phase Locked Loop (PLL) compensation filter 105 and then controls the 1 st LO 92 for phase locking the IF carrier to the reference signal. The output signal from the reference oscillator 104 is coupled to the clock input of the A/D converter 98 for sampling the IF signal at the input of the A/D converter 98. The A/D converter 98 generates the signal samples representative of the IF signal which are stored in a memory 106 for further processing, such as estimating the pilot signal phase according to the present invention. For M=4, a one to four relationship exists between the IF carrier frequency and a sampling frequency that drives an analog-to-digital (A/D) converter generating the signal samples. That is four samples are acquired for each cycle of the IF carrier signal or pilot.

Figure 4:
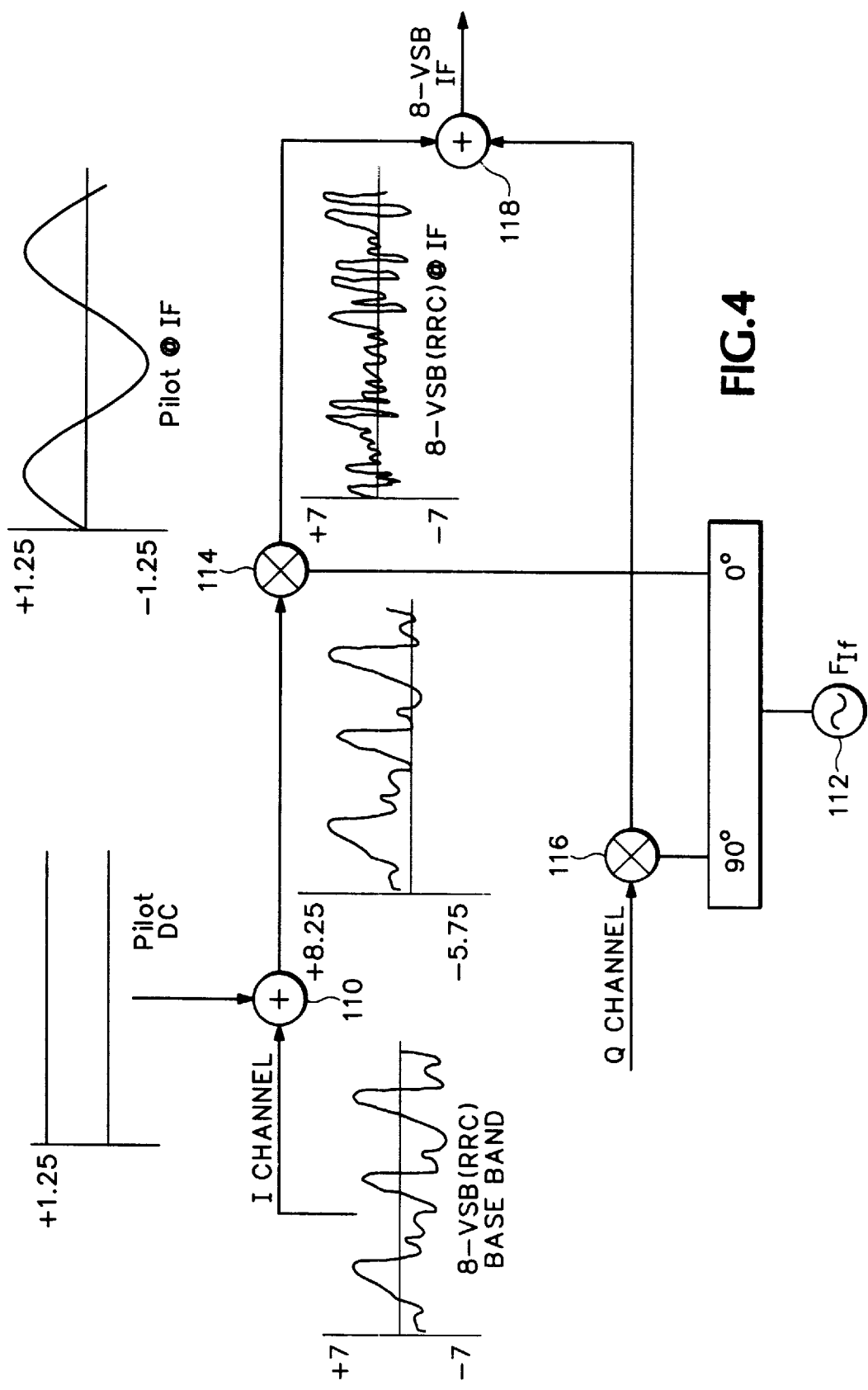
FIG. 4 is a simplified representation illustrative of the relationship of the I-channel signal and the pilot of an 8-VSB IF signal.

Referring to FIG. 4, there is shown a simplified representation illustrating the relationship of the I-channel signal and the pilot of an 8-VSB IF signal. The 8-VSB signal is a trellis coded signal having eight odd integer symbol levels or values from −7 to +7 that are passed through a root raised cosine filter (RRC) in the transmitter. At baseband, the pilot signal or tone is a DC level that is combined with the I channel trellis coded signal in summing circuit 110. The offset I channel signal modulates an IF signal from a local oscillator 112 in modulator 114. The DC pilot modulates the IF signal in modulator 114, which produces a tone at the IF frequency. The Q channel signal modulated the IF signal from the local oscillator 112 that is 90° out of phase with the I channel IF oscillator signal in modulator 116. The IF I and Q channel signals are combined in summing circuit 118 to produce a compound signal having the pilot sinusoid embedded in the 8-VSB modulated signal.

The signal samples representing the IF signal are real valued samples that may be viewed as real-axis values of a spinning complex vector representing the IF signal phase. Such a vector may be viewed in vector space having real and imaginary components. Viewing the digitally modulated IF signal on a graph with a horizontal real I axis and a vertical imaginary Q axis, there would be a spinning vector at the IF frequency generating a cloud of data points representing the signal samples of the digitally modulated IF signal. To obtain useful information from this cloud of points, the IF signal needs to be down converted to baseband by removing the IF carrier, and demodulated for correct timing and phase. If the IF pilot is in phase with the local oscillator phase then the down conversion and demodulation operations place the symbol data in the regions of the eight levels along the horizontal real or I axis producing a series of vertically aligned clouds of data points along the imaginary or Q axis called a constellation display. The demodulation operation includes passing the down converted signal samples through a RRC receiver filter to obtain the 8 discrete levels. However, if the IF pilot tone is not in phase with the local oscillator then the real axis of the constellation display is angled away from the horizontal axis by the phase difference between the IF pilot tone and the local oscillator phase. This produces a constellation display where the vertically aligned clouds of data points are angled from the horizontal I axis.

Figure 5:
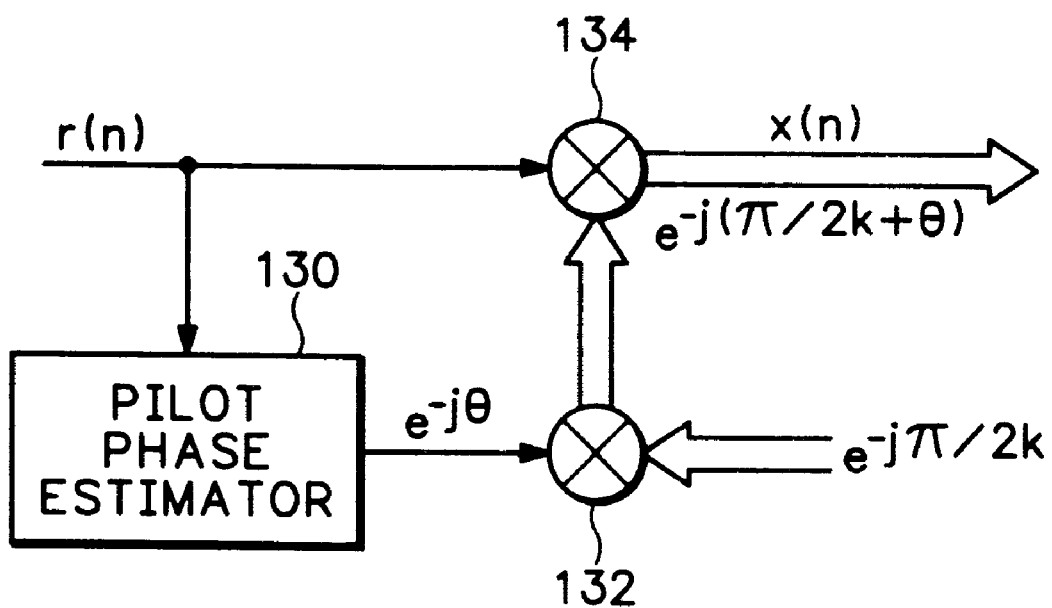
FIG. 5 is a representative block diagram of a portion of a software demodulator implementing the method of estimating the pilot signal phase according to the present invention.

Referring to FIG. 5, there is shown a representative block diagram of a portion of a software demodulator implementing the phase estimation method according to the present invention. The elements shown in FIG. 5 represent processes performed on the stored signal samples representing the digitized IF signal. A block of signal samples from memory 106 presenting the IF signal r(n) is processed through the pilot phase estimator 130 for determining the phase of the pilot tone or IF carrier. The block of signal samples is sufficient to perform narrow band filtering around the pilot signal and remove undesired digital modulation data for this process. The resultant phase value is combined with counter-rotating vector values in mixer 132 and applied to a complex mixer 134 for down converting the IF signal r(n) to baseband complex data values x(n).

The phase estimation method takes advantage of the pilot signal being at one-fourth of the sampling frequency. A Least-Squares based derivation of the phase estimation method shows that the method of the present invention is optimal in the least-square error sense. The pilot signal inside an 8-VSB signal can be expressed as the following where $f_c$ is equal to the carrier frequency normalized with respect to the sample frequency:

$$r(n) = A\cos(2\pi f_c n + \theta) + s(n) \quad (21)$$

$$= A\cos(2\pi f_c n)\cos(\theta) - A\sin(2\pi f_c n)\sin(\theta) + s(n) \quad (22)$$

where $$s(n) = s_i(n)\cos(2\pi f_c n + \theta) - s_q(n)\sin(2\pi f_c n + \theta) + V(n) \quad (23)$$

and s(n) is the noise-like 8-VSB signal and V(n) is additive white Gaussian noise, both of which are zero mean random variables that sum to zero over many samples. The in-phase and quadrature components (cos θ, sin θ) can be linearly modeled and optimally estimated in a Least-Squares sense, as shown below.

$$R = D\Phi \quad (24)$$

where $$R = [r(0), r(1), \ldots, r(n-1)]^T \quad (25)$$

$$\Phi = [A\cos(\theta), A\sin(\theta)]^T \quad (26)$$

$$D = \begin{bmatrix} \cos(2\pi f_c 0) & -\sin(2\pi f_c 0) \\ \cos(2\pi f_c 1) & -\sin(2\pi f_c 1) \\ \vdots & \vdots \\ \cos(2\pi f_c (n-1)) & -\sin(2\pi f_c (n-1)) \end{bmatrix} \quad (27)$$

$$\Phi = (D^T D)^{-1} D^T R \quad (28)$$

Since the normalized pilot frequency is one-forth the sampling rate ($f_c = \frac{1}{4}$), the phase calculation can be simplified as:

$$D^T = \begin{bmatrix} 1 & 0 & -1 & 0 & 1 & 0 & -1 & 0 & \ldots & 1 & 0 & -1 & 0 \\ 0 & -1 & 0 & 1 & 0 & -1 & 0 & 1 & \ldots & 0 & -1 & 0 & 1 \end{bmatrix} \quad (29)$$

$$(D^T D^{-1}) D^T = \frac{2}{N} D^T \quad (30)$$

-continued $$\Phi = \frac{2}{N}\begin{bmatrix} 1 & 0 & -1 & 0 & 1 & 0 & -1 & 0 & \ldots & 1 & 0 & -1 & 0 \\ 0 & -1 & 0 & 1 & 0 & -1 & 0 & 1 & \ldots & 0 & -1 & 0 & 1 \end{bmatrix} \quad (31)$$

$$\begin{bmatrix} r(0) \\ r(1) \\ \vdots \\ r(n-1) \end{bmatrix}$$

$$\theta = \tan^{-1}\left(\frac{\sum_{k=0}^{\frac{n}{4}} r(4k+3) - \sum_{k=0}^{\frac{n}{4}} r(4k+1)}{\sum_{k=0}^{\frac{n}{4}} r(4k) - \sum_{k=0}^{\frac{n}{4}} r(4k+2)}\right) \quad (32)$$

The terms r(4k), r(4k+1), r(4K+2), and r(4k+3) represent the signal samples at the sample locations on the pilot signal that are sequentially 90° apart from each other in phase. The numerator of the equation 32 represents sin θ and the denominator represents cos θ. Since the sample locations are 90° apart, the cos θ values at r(4k+2) are 180° from the cos θ values at r(4k) allowing the summed values of r(4k+2) to be subtracted from the summed values of r(4k). This process essentially averages the two sets of values at the r(4k) and r(4k+2) sample locations. Likewise, the sin θ values at r(4k+1) are 180° from the sin θ values r(4k+3) allowing the summed values at r(4k+1) to be subtracted from the summed values of r(4k+3). This process essentially averages the two sets of values at the r(4k+3) and r(4k+1) sample locations. In the actual implementation of the phase estimation method, the signs of the r(4k+1) and r(4k+2) values are reversed and respectively summed with the r(4k+3) and r(4k) values resulting in two data values representing sin θ and cos θ. Since the samples contain the zero mean modulation data and the pilot signal, the summation of the sample values achieves, by simple addition, a narrow band filtering function at the pilot signal frequency.

Figure 6:
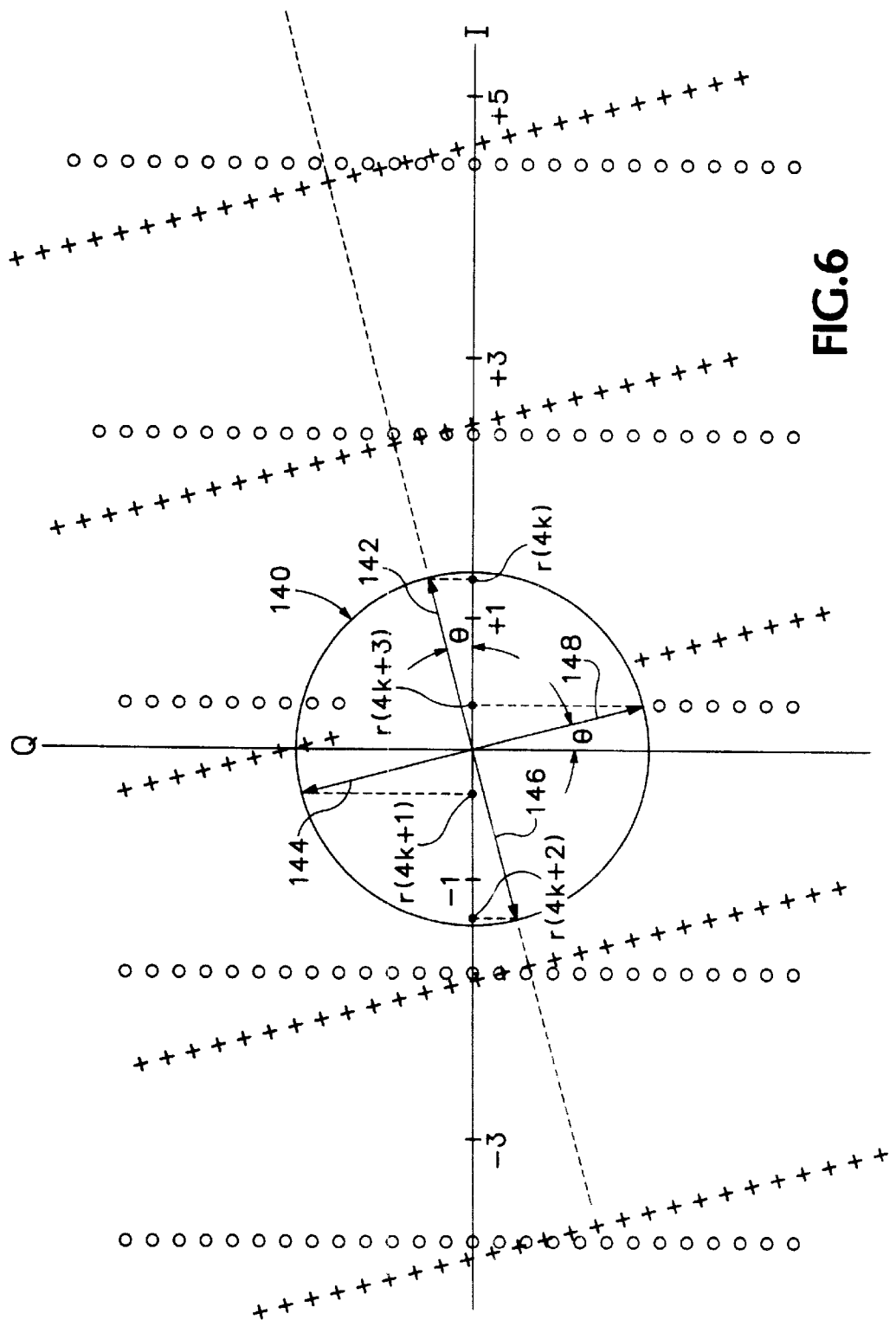
FIG. 6 is a graphical representation of the constellation diagram with a pilot signal vector diagram showing the relationships in the method for estimating the pilot signal phase according to the present invention.

Referring to FIG. 6, there is shown a partial representative view of a constellation display of symbol data with a pilot signal and the relationship of the pilot signal to the local oscillator signal as represented by a vector diagram 140. In the drawing, the symbol data is shown as offset on the real axis by the 1.25 pilot level. The vertically positioned constellation display, shown by the "o" symbol, represents a correct constellation display. The rotated constellation display, shown by the "+" symbol represents a constellation display having an angular offset caused by the phase offset between the IF carrier signal and the local oscillator signal. As represented in the diagram, the local oscillator is not in phase with the pilot tone producing a phase θ. The vector diagram 140 represents the pilot signal at the IF carrier. The pilot signal may be viewed as a complex vector spinning at the carrier frequency with samples being taken at 90° intervals as represented by vector positions 142, 144, 146 and 148. Since the pilot is a real signal, the data samples fall along the horizontal or I axis at r(4k), r(4k+1), r(4k+2), and r(4k+3). A block of digital data from memory 106 is processed producing the data points at r(4k), r(4k+1), r(4k+2), and r(4k+3). As previously described, the summed r(4k+2) data is combined with the summed r(4k) data and the summed r(4k+1) data is combined with the summed r(4k+3) data producing combined data values at r(4k) and r(4k+3). The r(4k) data value represents the cosine of θ and the r(4k+3) data value represents the sine of θ. Using the trigonometric relationship for arc-tangent, the r(4k) and r(4k+3) data values are used for determining the phase 0 of the pilot signal with respect to the local oscillator for down conversion.

It should be noted that the sampling process may start at any arbitrary time and that first acquired signal sample may occur in any one of the four quadrants represented in the phase diagram 140. Whatever the starting point of the acquisition, the first acquired data point is defined as r(4k) with the subsequent data points being sequentially defined as r(4k+1), r(4k+2), and r(4k+3). Because the pilot signal is being sampled at 90° intervals, the data values will always define the cosine and sine values for θ.

The pilot phase is applied to the complex mix process 134 to down convert the IF signal values r(n) to baseband complex signal x(n). The IF carrier may be viewed as a counter-clockwise spinning complex vector having a real-axis magnitude equal to the acquired sampled values. A complex multiplication is performed on each of the acquired sample points using a counter-rotating clockwise vector spinning at the same rate as the IF carrier and having the estimated phase. The result of this complex multiplication process is to align real signal components containing the symbol data along the horizontal real or I axis. Further processing will time align the data samples for timing synchronization in the acquisition system, perform equalization and regeneration of the Q channel signal for each of the data samples, remove the pilot and scale the data for generating the constellation and other displays.

Figure 7A:
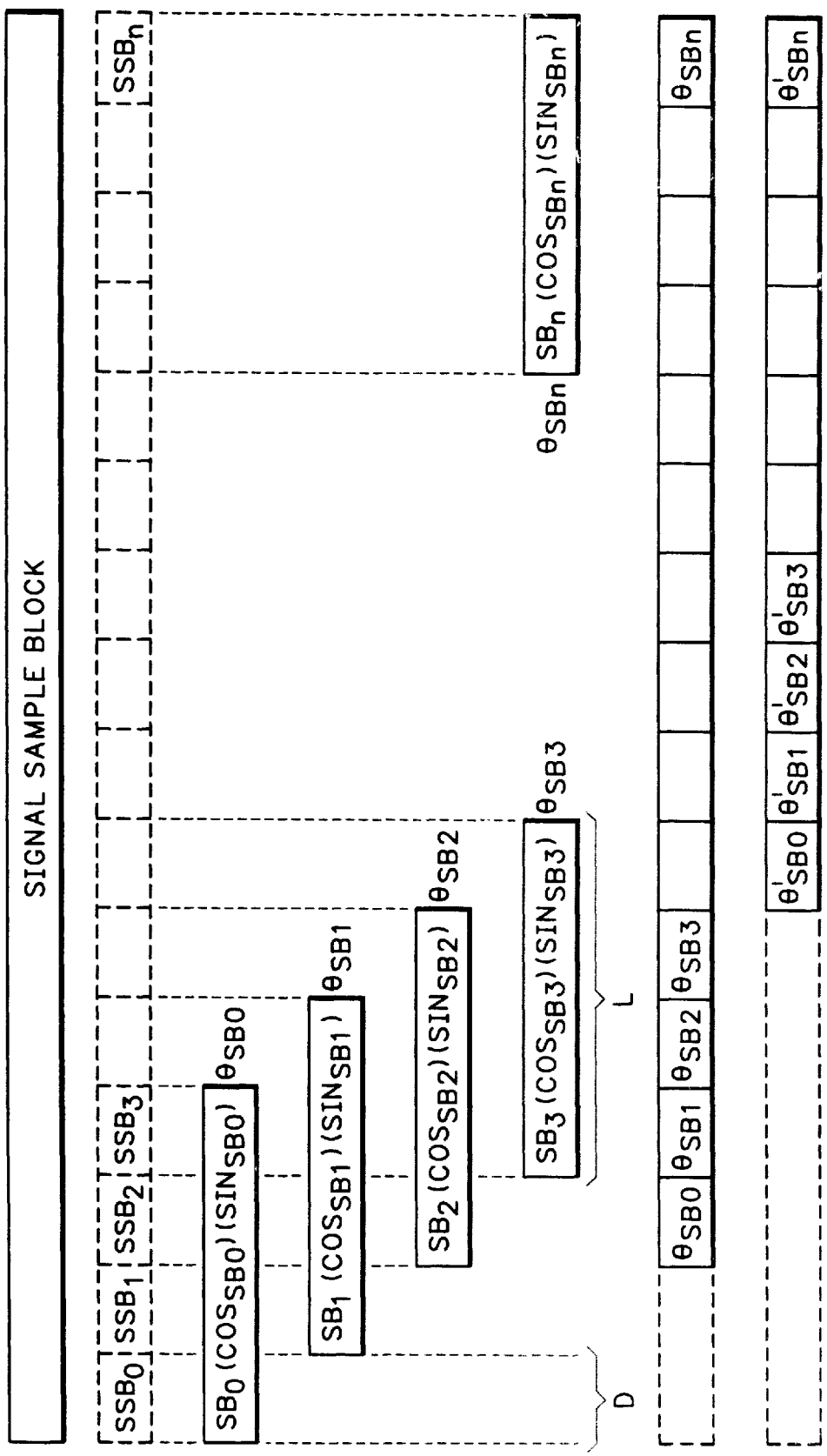
FIGS. 7A and 7B are illustrative of a decimation process for estimating the pilot signal phase according to the present invention.

In one implementation of the present invention, a block of acquired signal samples are used to determine the pilot phase or equivalently the IF carrier phase. The assumption is that the pilot phase is constant for all of the acquired data. However, due to phase noise in the transmitter or in the instrumentation receiver, this constant phase assumption may be invalid. This produces what best can be described as a "Hula" effect in the constellation display. The effect manifests itself as periodic rotations of the constellation display around the origin as a function of the phase drift. This effect is compensated in the commercialized implementation of the present invention by processing sub-blocks of the block of signal samples for estimating the pilot signal phase within the sub-blocks of samples and performing the complex multiplication mixing of portions of the samples in the sub-blocks with the estimated phase for that sub-block as illustrated in FIGS. 7A and 7B.

Figure 7B:
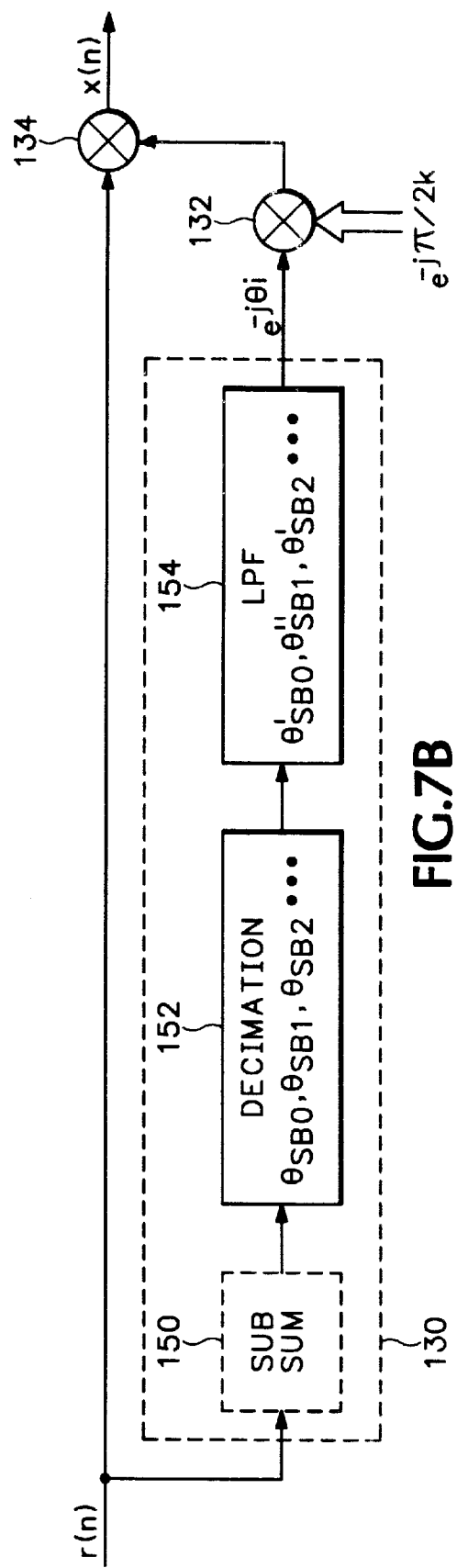

The process includes a decimation process 152 and a low pass filter 154 process as shown in FIG. 7B. The decimation process is illustrated in FIG. 7A. The signal sample block is divided into sub-blocks labeled $SB_0$, $SB_1$, $SB_2$, $SB_3$, ... $SB_n$, where D is the decimation ratio equal to an integer multiple of 4 ($4m_1$) and L is the sub-block length and is equal to an integer multiple of the decimation ratio ($m_2$ D). In the preferred embodiment of the invention, D is equal to 320 signal samples and L is equal to 4800 signal samples and L/D is equal to 15. The signal samples within each of the sub-blocks are summed in an addition process for removing the modulation data and to generate sine and cosine values representative of vector locations of the pilot signal as shown in the following equations.

$$\cos_{SB}\theta = \sum_{k=0}^{L-1} r(4k) - \sum_{k=0}^{L-1} r(4k+2) \quad (33)$$

$$\sin_{SB}\theta = \sum_{k=0}^{L-1} r(4k+3) - \sum_{k=0}^{L-1} r(4k+1) \quad (34)$$

The pilot signal phase θ over each of the sub-blocks of data is determined using the sine and cosine values $\cos_{SB}\theta$ and $\sin_{SB}\theta$.

$$\theta_{SB} = \tan^{-1}\left(\frac{\sin_{SB}\theta}{\cos_{SB}\theta}\right) \quad (35)$$

The pilot phase estimations $\theta_{SB0}$, $\theta_{SB1}$, $\theta_{SB2}$, $\theta_{SB3}$, ... $\theta_{SBn}$, are passed through a low pass filter 154 filter having sufficient bandwidth to pass the phase variations of the local oscillator 92 but narrow enough to block the digital signal data. In the preferred embodiment the low pass filter has a 3 dB bandwidth of 1 KHz.

$$\theta_{SB}' = h_{LPF} \otimes \theta_{SB} \quad (36)$$

The resultant phase values, $\theta'_{SB0}$, $\theta'_{SB1}$, $\theta'_{SB2}$, $\theta'_{SB3}$, ... $\theta'_{SBn}$, which have an initial delay due to the decimation and filtering processes, are combined with counter-rotating vector values in mixer 132 and applied to the complex mixer 134 for down converting the IF signal r(n) to baseband complex data values x(n).

For computational efficiency in the preferred embodiment, the sub-blocks are divided into further sub-sum blocks 150 labeled $SSB_0$, $SSB_1$, $SSB_2$, $SSB_3$, $SSB_4$, ... $SSB_n$, . The sin θ numerator summation value and cos θ denominator summation value of equations 33 and 34 are determined for each sub-sum block. The sin θ and cos θ values of the sub-sum blocks covering the respective sub-blocks are added together to produce the sin θ and cos θ values for the respective sub-blocks. Equation 35 is applied to the summed sin θ and cos θ values for estimating the pilot signal phase θ over the sub-blocks. The resultant pilot signal phase estimation output θ of the low pass filter 154 may be linearly interpolated to provide additional pilot signal phase estimation values between the values calculated using equation 35.

A method has been described for estimating the phase of a pilot tone embedded in a wideband digital signal modulating a RF signal. The details of the method have been described as they apply to an 8-VSB IF signal. The IF signal contains a pilot signal at the intermediate frequency and digital modulation data with zero mean and wide spread spectrum. The sampling signal driving the analog-to-digital converter generates at a minimum two digital signal samples per pilot cycle that are arbitrary phase angles. For optimum performance of the phase estimation method, the sampling instances of the analog-to-digital converter for generating the signal samples is at four equally spaces points in the pilot cycle. The method is equivalent to a computationally efficient narrow band filter generated at the pilot signal frequency by simple addition of the signal samples. The phase estimation method includes the steps of summing a block of the signal samples in a process for removing the modulation data and generating data values representative of vector locations of the pilot signal with each data value representing an angular rotation of the pilot signal from the local oscillator signal, and calculating the pilot phase as a function of the arc tangent of the data values. Where there is phase variation present in the IF carrier or pilot, additional phase values are estimated over sub-blocks of the block of signal samples and low pass filtered to generate an accurate phase value for applying to corresponding sub-blocks of signal samples. This process acts as a phase tracker to eliminate phase drift in the demodulated signal.

It will be obvious to those having skill in the art that many changes may be made to the details of the above-described embodiments of this invention without departing from the underlying principles thereof. The scope of the present invention should, therefore, be determined only by the following claims.

What is claimed is:

1. In a digital acquisition system generating signal samples representative of a digitally modulated intermediate frequency signal having a pilot signal or tone embedded in a wide bandwidth digital modulation signal modulating a carrier signal where the digitally modulated intermediate frequency signal is sampled by a sampling signal, a method of estimating pilot signal phase comprising the steps of:

summing a block of the signal samples for removing the modulation data and generating data values representative of vector locations of the pilot signal with each of data values representing an angular rotation of the pilot signal vector; and calculating the phase of the pilot signal by determining the arc tangent of the data values.

2. The method of estimating pilot phase as recited in claim 1 wherein calculating set further comprises the step of determining sine and cosine values of the angular rotation using the data values.

3. The method of estimating pilot phase as recited in claim 2 wherein the digitally modulated intermediate frequency signal is sampled with the sampling signal at four times the pilot signal frequency and the summing step further comprising the step of generating two data values representing the cosine values of the angular rotation of the pilot signal vector and two data values representing the sine values of the angular rotation of the pilot signal vector.

4. The method of estimating pilot phase as recited in claim 3 wherein the two data values representing the cosine values are one-hundred and eighty degrees apart from each other and the two data values representing the sine values are one-hundred and eighty degrees apart from each other with the filtering step further comprising the step of summing the negative of one of the cosine values with the other cosine value for generating an averaged data value representing the cosine value of the angular rotation of the pilot vector and summing the negative of one of the sine values with the other sine value for generating an averaged data value representing the sine value of the angular rotation of the pilot vector.

5. The method of estimating pilot phase as recited in claim 1 wherein intermediate frequency carrier and pilot signal vary in phase over time generating a pilot signal varying in phase, the method further comprising the steps of:

decimating the block of signal samples by summing sub-blocks within the block of signal samples for removing the modulation data and generating data values representative of vector locations of the pilot signal with each of the data values representing an angular rotation of the pilot signal vector within the sub-blocks, with each sub-block being offset from the previous sub-block by a decimation factor; and calculating the pilot phase by determining the arc tangent of the data values within the sub-blocks.

6. The method of estimating pilot phase as recited in claim 5 further comprising the step of filtering the phases of the pilot signal from the sub-blocks with a filter having sufficient bandwidth for tracking the phase variations.

7. The method of estimating pilot phase as recited in claim 6 further comprising the step of interpolating between the calculated phases of the pilot signal of the sub-blocks for generating additional phases of the pilot signal.

* * * * *